United States Patent Office 3,274,132
Patented Sept. 20, 1966

3,274,132
PROCESS OF POLYMERIZING AND FOAMING CAPROLACTAM
John W. Giberson, Woodstown, N.J., assignor to E. I. du Pont de Nemours and Company, Wilmington, Del., a corporation of Delaware
No Drawing. Filed Apr. 22, 1963, Ser. No. 274,803
6 Claims. (Cl. 260—2.5)

This application is a continuation-in-part of copending application Serial No. 211,898 filed July 23, 1962, now abandoned.

This invention relates to a process, and more particularly to an improved process for the polymerization of lactams to polyamides.

The polymerization of caprolactam to give 6-nylon, a polyamide, has been known for many years. The earliest processes for this polymerization were slow, requiring several hours, and involved the use of water or acidic reagents as polymerization catalysts. Subsequent work showed that anhydrous caprolactam could be polymerized above 200° C. in the presence of strongly basic materials, particularly the alkali and alkaline earth metals, their hydrides, hydroxides, alkoxides, oxides, alkyls or amides. More recently, it has been disclosed that the base- catalyzed polymerization of caprolactam and other lactams can be made especially fast by the addition of certain compounds which function as cocatalysts. Particularly effective cocatalysts which have been disclosed include acylating agents such as acyl halides, anhydrides and the like; isocyanates, and compounds containing tertiary nitrogen having at least two of the three substituents on the nitrogen atom consisting of carbonyl, thiocarbonyl, sulfonyl, phosphenyl, thiophosphenyl and nitroso radicals.

The present invention provides an improved process for rapidly polymerizing lactams. More particularly, the process of this invention is an improvement in the process for polymerizing lactams in the presence of lactambase salts, which improvement comprises carrying out said polymerization in the presence of a cocatalyst of the formula

wherein the R's are selected from at least one of the group consisting of hydrogen, aliphatic, cycloaliphatic and aryl radicals, preferably of up to 18 carbon atoms, and wherein X comprises a heterocyclic ring containing a ring nitrogen bonded to said

and at least two conjugated double bonds.

Heterocyclic ring systems comprising X in the novel cocatalysts of the present invention are imidazole, pyrazole, indazole, benzimidazole, 1,2,3-benzotriazole, 2,1,3-benzotriazole, indole, carbazole, pyrrole, 1,2,3,6-oxatriazine, 1,2,6-oxadiazine, 1,2,3-triazole, 2,1,3-triazole, 1,2,4-triazole, purine and many others. Substituted derivatives of the foregoing are also suitable. The substituents can be, for example, alkyl having from 1 to 12 carbon atoms such as methyl, ethyl, isopropyl, butyl, isoamyl, hexyl, 2-ethylhexyl, decyl, or dodecyl; halogen such as chlorine or bromine; amino; 5 to 12 carbon cycolaliphatic such as cyclopentyl, cyclohexyl, cyclooctyl or cyclodecyl; and 6 to 10 carbon aryl such as phenyl, naphthyl, tolyl or chlorophenyl. The substituents should be inert, that is, free of functional groups which will react with the strong base or lactam under the conditions of polymerization.

In addition to having at least one nitrogen atom bonded to $R_2NCO-$, the heterocyclic ring comprising X can contain other hetero atoms such as oxygen, sulfur, nitrogen, phosphorus, or boron provided that the valence of said hetero atom is compatible with the requirement that at least one system of two conjugated double bonds be found in the ring.

As previously indicated, R can be hydrogen; aliphatic such as methyl, ethyl, isopropyl, butyl, amyl, octyl, decyl, dodecyl, chloroethyl or bromoethyl; cycloaliphatic such as cyclopentyl, cyclohexyl, cyclooctyl or cyclodecyl; aryl such as phenyl, naphthyl, tolyl, chlorophenyl or bromophenyl. R should be an inert radical free of functional groups which react with the base catalyst or lactam under the conditions of polymerization. As previously indicated, the two R groups can be the same or different groups falling within the definition above.

Preferred cocatalysts are the compounds of the foregoing structure wheerin X has a five-membered ring having at least 2 nitrogens in the ring and each R is phenyl. This class of cocatalysts has outstanding catalytic activity and hydrolytic stability and is capable of being used to vary the speed of polymerization within wide limits by varying the quantity of cocatalysts present. Isocyanates, for example, are not so versatile as cocatalysts because if the quantity of isocyanate is lowered to the point necessary to reduce the polymerization speed appreciably, trace quantities of water react with the isocyanates and remove them from the system. These preferred compounds of the present invention have better hydrolytic stability and lower toxicity than isocyanates also.

Illustrative cocatalysts of this invention are carbamylimidazoles such as 1-dimethylcarbamylimidazole,
1-phenylcarbamylimidazole,
1-diphenylcarbamylbenzimidazole,
1-dicyclopentylcarbamylimidazole,
1-dicyclohexylcarbamylimidazole,
1-dicyclooctylcarbamylimidazole,
1-methylethylcarbamylimidazole and
7-diphenylcarbamyl-6-aminopurine; carbamyl pyrazoles such as
1-dimethylcarbamylpyrazole,
1-phenylethylcarbamylpyrazole,
1-diphenylcarbamyl-3,5-dimethylpyrazole,
1-diphenylcarbamyl-4-chloropyrazole,
1-dimethylcarbamyl-3,5-dimethylpyrazole and
1-di(cyclohexylmethyl)carbamylpyrazole; carbamyltriazoles such as
1-phenylcarbamyl-1,2,3-triazole,
1-diphenylcarbamyl-3-amino-1,2,4-triazole,
1-dimethylcarbamyl-1,2,3-benzotriazole and
1-diphenylcarbamyl-2,1,3-benzotriazole; carbamyl indazoles such as
1-diphenylcarbamylindazole,
1-dimethylcarbamyl-3methylindazole,
1-cyclohexylmethylcarbamylindazole,
1-diptolylcarbamylindazole, and
1-di-m-chlorophenylcarbamylindazole;
and mixtures thereof.

Certain of the aforementioned cocatalysts are new compounds in particular those which consist of compounds having the structure

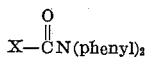

wherein X comprises a five-membered heterocyclic ring containing two conjugated double bonds and at least two non-adjacent ring nitrogen atoms, one of which is bonded to said

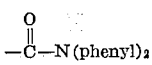

Particularly effective and preferred cocatalysts of the aforementioned group are 1-diphenylcarbamylimidazole, 1-diphenylcarbamylbenzimidazole, and 1-diphenylcarbamyl-1,2,3-benzotriazole.

The cocatalysts of the present invention are prepared by the reaction of a compound having the structure

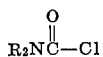

with a compound satisfying the definition of X. One procedure is to heat for example at reflux, the heterocyclic compound, the carbamyl chloride and an acid acceptor such as triethylamine, usually in equimolar quantities, in a solvent such as benzene, toluene or xylene for about 2 to 8 hours, and usually about six hours. The product is recovered by washing the product mixture with water followed by evaporation of the solvent. The solids are recrystallized from ethanol.

Properties for several

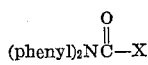

compounds prepared by the above method are listed in the table below:

| X | Percent N (theory) | Percent N (found) | Melting Point (° C.) |
|---|---|---|---|
| Pyrazole | 16.0 | 15.7 | 133 |
| Imidazole | 16.0 | 16.2 | 124 |
| Benzimidazole | 13.5 | 13.3 | 198–9 |
| 1,2,3-benzotriazole | 17.9 | 17.6 | 136 |

The polymerization process of this invention is particularly effective in producing rapidly high molecular weight polyamides from lactams containing from 3 to 12 or more carbon atoms in the lactam ring. Such lactams include pyrrolidone, piperidone, ε and γ-caprolactam, enantholactam, caprylolactam, and laurolactam and mixtures thereof. Generally, the anionic polymerization process can be carried out at temperatures above the melting point of the lactam monomer but below the melting point of the resulting polyamide. In general, this temperature range is from about 25° C. to about 200° C., depending on the particular lactam employed. With lactams containing less than 6 carbon atoms in the lactam ring, the preferred temperature of polymerization is below 150° C. ε-Caprolactam is readily polymerized by the process of this invention at temperatures between 100 and 200° C. with 150° C. being a convenient operating temperature.

The lactam-base salts used in the process of this invention are prepared by the reaction of bases with a lactam. Generally, the lactam to be polymerized is used for the preparation of the anionic catalyst; but if desired, the anionic catalyst can be prepared from another lactam.

The base employed to form the anionic catalyst can be an alkali metal, an alkaline earth metal, or a basic derivative of one of these metals such as hydroxide; alkoxide, hydride, alkyl, aryl, or amide. All of these bases are of the type which are strong enough to convert the lactam to its iminium salt. Thus, sodium hydroxide, potassium hydroxide, lithium hydroxide, magnesium hydroxide, calcium hydroxide, strontium hydroxide, lithium hydride, sodium hydride, sodium methoxide, sodium methyl, sodium ethyl, sodium phenyl, sodium naphthyl, sodamide, and mixtures thereof are examples of suitable bases for the preparation of the anionic catalyst.

The bases can be used as such or admixed with diluents to delay absorption of moisture. These diluents can be such materials as mineral oil or other hydrocarbon materials (aromatic, alicyclic or aliphatic). A partially hydrogenated terphenyl sold under the name of HB–40 is a particularly effective diluent from the standpoint of compatibility with polymeric systems and freedom from foaming on mixing with the molten lactam. This anionic catalyst, that is, lactam-base salt, is prepared by heating the lactam with a base at a temperature between about 25 and 225° C. The base can be added to the total lactam which is to be polymerized or to a portion of the lactam which is to be polymerized and this portion of the resultant lactam containing the anionic catalyst added to more of the lactam later. Little or no polymerization occurs during the preparation of the anionic catalyst carried out between the melting point of the lactam and about 225° C. The time required for this step in the process depends upon the strength of the base employed, the proportion added, and the temperature chosen and can be from a few seconds to several hours. If the solution of lactam-base salt in lactam is to be held for long periods of time before use, the temperature should be kept below 125° C. The lactam should be essentially anhydrous as should the added base. The concentration of the base usually is such as to provide a final concentration for the polymerization in the range of between 0.1 and about 10 mole percent based on the lactam polymerized. Proportions in the higher end of this range produce lower molecular weight polyamides, so optimum proportions for most purposes are from about 0.2 to 5 mole percent of the strong base. The $$X-\overset{O}{\underset{\|}{C}}NR_2$$

cocatalyst can be employed in proportions varying from about 0.05 to about 5 mole percent based on the lactam polymerized. The cocatalyst can be added to the lactam containing the anionic catalyst, or equally well the cocatalyst can be dissolved in a separate portion of the lactam and the two portions of lactam mixed at the time the polymerization is desired. For optimum operation of the process of this invention an inert gas such as nitrogen is bubbled through the molten lactam during the initial reaction with the basic catalyst in order to remove any low molecular weight compound formed such as water and in order to prevent oxidation. Alternatively, the reaction of the lactam with the basic catalyst can be carried out under reduced pressure in which case the low molecular weight compound is distilled from the lactam.

The process of this invention is useful in rapidly preparing cast articles of any size and shape from lactams. The process can be employed to obtain unusual shapes which would be difficult, if not impossible, to obtain by conventional molding of prepolymerized polyamides. The process has the advantage when used in this fashion that high temperatures and high pressures normally required in injection molding and similar processes are not necessary. Therefore, simpler lighter weight molds can be employed and faster cycles can often be obtained in the preparation of large shaped articles. The entire process can be carried out in the mold or, if desired, the lactam solution containing the anionic catalyst and a second portion of the lactam solution containing the cocatalyst can be mixed and then immediately cast into the mold by procedures similar to transfer molding to obtain the desired shaped article in any size at a very high rate. Similarly, it is possible to employ the process of this invention in many extrusion-type operations, in which the lactam containing the anionic catalyst and another portion of the lactam containing the cocatalyst are intimately mixed and then extruded under conditions which provide for obtaining an extrudate which is polymerized as it is formed.

The process of this invention is operable in the presence of various fillers and reinforcing agents. Thus, if desired, glass mats or mats of synthetic fibers can be impregnated with the solution and rapidly cured. Similarly, finely-divided fillers can be suspended in the polymerizing mixture to obtain filled polyamides. Antioxidants, blowing agents, plasticizers, other resins (e.g., styrene, acrylic, nylon polyester), colorants, and the like may also be employed. The process of this invention contemplates the use of the process under all of the above conditions.

The process of this invention can likewise be used in the presence of a gas-generating material to give foamed plastic articles. The gas-generating material can be a low boiling liquid or an unstable compound which releases gas when heated. The process of this invention likewise can be carried out as a coating process in which the lactam solution containing anionic catalyst and the cocatalyst is applied as a liquid to the surface of a web such as paper or a textile and then permitted to polymerize to the polyamides and thus form a coating of polyamide film on a substrate.

The invention is more thoroughly illustrated with the aid of the following examples. Parts and percentages where given are by weight.

*Examples 1 through 23*

In these examples, a mixture of 22.6 parts of ε-caprolactam and base (sodium hydride or sodium methoxide) is placed in a reaction vessel which is immersed in an oil bath at 150° C., nitrogen is bubbled through the molten caprolactam at the rate of 350 cc./minute. After heating for 20 minutes the cocatalyst to be used is added to the molten caprolactam at 150° C. The course of the polymerization is observed visually and the time from the addition of the cocatalyst to the time at which no perceptible flow of the melt occurred when the reaction vessel is held at a 45° angle is observed. This is recorded as "no flow time." The total time for the polymerization is manifested by shrinking of the polymer from the walls of the reaction vessel. Solutions of polymers made using the cocatalysts of the present invention in 90% formic acid contained gel particles indicating that crosslinking occurred during the polymerization.

The cocatalysts described above can be prepared by reacting equimolar quantities of the indicated pyrazole, indazole, imidazole, triazole; the indicated carbamyl derivative and triethylamine acid acceptor in benzene solvent at a temperature of 50° C. to 200° C. Naturally if the reaction is carried out above the boiling point of benzene a pressure reaction vessel must be used. For example, 1-diphenylcarbamylimidazole can be prepared by reacting 1 mole of diphenylcarbamyl chloride with 1 mole of imidazole and 1 mole of triethylamine in about 1000 parts of benzene at a temperature of 78° C. for 6 hours, washing the resulting product with water, stripping benzene from the reaction mixture and finally crystallizing the resulting 1-diphenylcarbamylimidazole from ethanol.

Other cocatalysts which can be substituted for those described in the examples above on an equimolar basis are 1 - dicyclohexylcarbamylimidazole, 1 - di - p - chlorophenylcarbamylpyrazole, 1 - diphenylcarbamyl-3-phenylpyrazole, 1 - di - p - tolylcarbamylimidazole, 1-di(phenylethyl)carbamylpyrazole and 1-diphenylcarbamylindazole. Also, in a like manner, valerolactam, enantholactam and caprylolactam can be substituted for the ε-caprolactam employed in the above examples to obtain similar results.

*Examples 24 through 27*

The following examples are conducted exactly like Examples 1 through 23 with the exception that mixtures of lactams are polymerized. The mixture of lactams is substituted on an equimolar basis for the ε-caprolactam in the procedure given.

| Example No. | Lactam Mixture | Sodium Hydride (mole percent) | Cocatalyst | Mole Percent | No flow Time (seconds) |
|---|---|---|---|---|---|
| 24 | 75% ε-Caprolactam / 25% ω-Caprylolactam | 1.5 | 1-diphenylcarbamylimidazole | 0.4 | 17 |
| 25 | 50% ε-Caprolactam / 50% ω-Caprylolactam | 1.5 | ____do____ | 0.4 | 12 |
| 26 | 25% ε-Caprolactam / 75% ω-Caprylolactam | 1.5 | ____do____ | 0.4 | 6 |
| 27 | 50% ε-Caprolactam / 50% ω-Laurolactam | 1.5 | ____do____ | 0.4 | 42 |

*Example 28*

ε-Caprolactam (9072 parts) is melted and sparged for 30 minutes at 130° C. with nitrogen.

A ε-caprolactam mix containing 3 mole percent of sodium caprolactam is prepared by adding 129.8 parts of sodium methoxide to 9072 parts of caprolactam sparged as above at 100° C. and continuing sparging for 60 min-

| Example No. | Cocatalyst | Sodium Methoxide, mol. percent | | Sodium Hydride Catalyst, percent | | No flow Time (min.) | Relative Viscosity |
|---|---|---|---|---|---|---|---|
| | | Catalyst | Cocatalyst | Catalyst | Cocatalyst | | |
| 1 | 1-diphenylcarbamylpyrazole | 1.6 | 0.20 | | | 2.5 | 5.8 |
| 2 | 1-dimethylcarbamyl-3-methylindazole | 1.6 | 0.40 | | | 12.5 | |
| 3 | 1-dimethylcarbamylpyrazole | 1.6 | 0.40 | | | 7.5 | |
| 4 | 1-diphenylcarbamyl-3,5-dimethylpyrazole | 1.6 | 0.20 | | | 2.0 | |
| 5 | 1-diphenylcarbamyl-4-chloropyrazole | 1.6 | 0.40 | | | 4.0 | |
| 6 | 1-dimethylcarbamyl-3,5-dimethylpyrazole | 1.6 | 0.4 | | | 4.0 | |
| 7 | 1-diphenylcarbamylpyrazole | | | 1.5 | 0.40 | 1.0 | 4.32 |
| 8 | 1-phenylcarbamylimidazole | | | 1.5 | 0.40 | 1.5 | |
| 9 | 1-diphenylcarbamylimidazole | | | 1.5 | 0.40 | 0.8 | |
| 10 | 1-phenylcarbamylbenzimidazole | | | 1.5 | 0.40 | 1.3 | |
| 11 | 1-diphenylcarbamylbenzimidazole | | | 1.5 | 0.40 | 1.2 | |
| 12 | 1-diphenylcarbamylbenzo-1,2,3-triazole | | | 1.5 | 0.40 | 1.0 | |
| 13 | 1-phenylcarbamyl-1,2,3-triazole | | | 1.5 | 0.40 | 1.0 | |
| 14 | 1-phenylcarbamylpyrazole | | | 1.5 | 0.40 | 1.5 | |
| 15 | 1-diphenylcarbamylimidazole | 1.5 | 0.4 | | | 1.3 | |
| 16 | 1-diphenylcarbamylpyrazole | | | 1.5 | 0.05 | 5.0 | |
| 17 | 1-diphenylcarbamylimidazole | | | 3.0 | 0.40 | 0.5 | |
| 18 | ____do____ | | | 0.5 | 0.20 | 5.0 | |
| 19 | 1-diphenylcarbamyl-3-amino-1,2,4-triazole | | | 1.5 | 0.40 | 1.6 | |
| 20 | 1-diphenylcarbamyl-3,4-dicyano-5-amino-pyrazole | | | 1.5 | 0.40 | 2.5 | |
| 21 | 1-phenylcarbamyl-3-amino-1,2,4-triazole | | | 1.5 | 0.40 | 4.5 | |
| 22 | 1-diphenylcarbamyl-2-aminobenzimidazole | | | 1.5 | 0.40 | 8.3 | |
| 23 | 7-diphenylcarbamyl-6-aminopurine | | | 1.5 | 0.40 | 5.5 | | utes. The mixture is then degassed for 20 minutes at a vacuum of 24–25 inches of mercury. Potassium stearate (240 parts) is dissolved in 4000 parts of the 3 mole percent sodium caprolactam mix and 75 parts of 1-diphenylcarbamylimidazole cocatalyst is separately dissolved in 4000 parts of the sparged caprolactam. The two melts are heated to 150° C. and 64 parts of n-nonane are injected into the melt containing cocatalyst. The 3 mole percent sodium caprolactam mix is then added and the mixture stirred briefly (35 seconds). Foaming begins 45 seconds after adding the sodium caprolactam. After 10 minutes the mixture had foamed and solidified. The light cream foam has a fine uniform cell structure, it is quite tough and has a density of 0.58 gram/cc.

*Example 29*

The procedure of Example 19 was repeated using 86.54 parts of sodium methoxide instead of 129.8 parts and substituting dodecenyl azide for the n-nonane as the blowing agent. Similar results are obtained. The foam has a density of 0.50 gram/cc.

I claim:

1. A process for the polymerization of ε-caprolactam to poly-ε-caprolactam which comprises heating said lactam in the presence of a lactam base salt prepared by the reaction of a base with a lactam and a cocatalyst having the formula

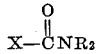

wherein the R's are selected from at least one of the group consisting of hydrogen, aliphatic, cycloaliphatic and aryl radicals of up to 18 carbon atoms, X comprises a 5-membered heterocyclic ring having two conjugated double bonds and at least two ring nitrogen atoms, one of which is bonded to said

at a temperature between the melting point of said ε-caprolactam and the melting point of said poly-ε-caprolactam.

2. The process of claim 1 wherein each R is phenyl.

3. The process of claim 2 wherein said cocatalyst is selected from the group consisting of 1-diphenylcarbamylimidazole, 1 - diphenylcarbamylpyrazole, 1 - diphenylcarbamylbenzimidazole, 1-diphenylcarbamyl-1,2,3-benzotriazole, 1-diphenylcarbamylindazole and 1-diphenylcarbamyl-3-amino-1,2,4-triazole.

4. A process of claim 1 wherein said base is sodium hydridelactam salt.

5. A process of claim 1 wherein said base is sodium methoxidelactam salt.

6. A process of claim 1 wherein said reaction is carried out in the presence of a gas-evolving compound to yield a foamed plastic.

References Cited by the Examiner

UNITED STATES PATENTS

| | | | |
|---|---|---|---|
| 2,268,160 | 12/1941 | Miles | 260—2.5 |
| 2,700,669 | 1/1955 | Scalera et al. | 260—308 |
| 2,808,379 | 10/1957 | Walter | 260—2.5 |
| 2,884,424 | 4/1959 | Klingsberg | 260—308 |
| 3,017,391 | 1/1962 | Mottus | 260—2.5 |
| 3,052,642 | 9/1962 | Hunter et al. | 260—2.5 |

FOREIGN PATENTS 1,229,130  3/1960  France.

OTHER REFERENCES

Elderfield, Heterocyclic Compounds, Vol. 7, pages 422–423.

SAMUEL H. BLECH, *Primary Examiner.*

NICHOLAS S. RIZZO, MURRAY TILLMAN,
*Examiners.*

A. D. ROLLINS, M. FOELAK, *Assistant Exmainers.*